United States Patent
Wu et al.

(10) Patent No.: US 10,917,426 B2
(45) Date of Patent: *Feb. 9, 2021

(54) METHOD AND DEVICE FOR DETERMINING DATA ANOMALY

(71) Applicant: Advanced New Technologies Co., Ltd., Grand Cayman (KY)

(72) Inventors: Yuehao Wu, Hangzhou (CN); Ling Xie, Hangzhou (CN); Xin Xu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,078

(22) Filed: Jun. 24, 2020

(65) Prior Publication Data

US 2020/0329063 A1    Oct. 15, 2020

Related U.S. Application Data

(63) Continuation of application No. 16/810,961, filed on Mar. 6, 2020, which is a continuation of application No. PCT/CN2018/116085, filed on Nov. 19, 2018.

(30) Foreign Application Priority Data

Dec. 29, 2017    (CN) .......................... 2017 1 1474464

(51) Int. Cl.
*H04L 29/06* (2006.01)
*G06N 7/00* (2006.01)
*G06N 20/00* (2019.01)

(52) U.S. Cl.
CPC ......... *H04L 63/1425* (2013.01); *G06N 7/005* (2013.01); *G06N 20/00* (2019.01); *H04L 63/1416* (2013.01)

(58) Field of Classification Search
CPC . H04L 63/1425; H04L 63/1416; G06N 7/005; G06N 20/00
See application file for complete search history.

(56) References Cited

U.S. PATENT DOCUMENTS

| 5,705,739 | A   |   | 1/1998 | Levine et al. |
| 7,712,134 | B1  | * | 5/2010 | Nucci .................. H04L 63/145 726/23 |

(Continued)

FOREIGN PATENT DOCUMENTS

| CN | 103111982 | 12/2013 |
| CN | 105262647 | 1/2016 |

(Continued)

OTHER PUBLICATIONS

Bonelee, cnblogs.com [online], "Clustering-Anomaly Detection," Nov. 2017, retrieved on Jan. 7, 2020, retrieved from URL<https://www.cnblogs.com/bonelee/p/7776565.html>, 15 pages (with machine translation).

(Continued)

*Primary Examiner* — Darren B Schwartz
(74) *Attorney, Agent, or Firm* — Fish & Richardson P.C.

(57) ABSTRACT

Computer-implemented methods, non-transitory, computer-readable media, and computer-implemented systems for determination of anomalous data are provided. In a computer-implemented method, a plurality of data packets is received within a predetermined time period, the plurality of data packets comprising a data structure. A historical distribution of historical data including the data structure as the data packets is determined. The plurality of data packets is compared to the historical distribution to generate a comparison result. If it is determined that data anomaly exists in the plurality of data packets according to the comparison result, an alert indicating the data anomaly is generated.

20 Claims, 8 Drawing Sheets

(56) References Cited

U.S. PATENT DOCUMENTS

| | | | |
|---|---|---|---|
| 9,106,689 B2 | 8/2015 | Steinbrecher et al. | |
| 9,628,499 B1* | 4/2017 | Yu | H04L 43/022 |
| 9,979,740 B2 | 5/2018 | Cluistian | |
| 10,375,096 B2* | 8/2019 | Machlica | H04L 63/1441 |
| 10,686,816 B1* | 6/2020 | Shintre | H04L 63/1425 |
| 2003/0074582 A1* | 4/2003 | Patel | H04L 63/1408 726/4 |
| 2003/0145231 A1* | 7/2003 | Poletto | H04L 63/1416 726/22 |
| 2003/0149777 A1 | 8/2003 | Adler | |
| 2005/0270984 A1 | 12/2005 | Kodialam et al. | |
| 2006/0106743 A1 | 5/2006 | Horvitz | |
| 2007/0076611 A1 | 4/2007 | Magnaghi et al. | |
| 2007/0280114 A1* | 12/2007 | Chao | H04L 47/10 370/235.1 |
| 2008/0091766 A1 | 4/2008 | Briscoe et al. | |
| 2009/0024758 A1 | 1/2009 | Levy-Abegnoli et al. | |
| 2009/0207740 A1 | 8/2009 | Crotti et al. | |
| 2010/0064368 A1 | 3/2010 | Stolfo et al. | |
| 2010/0071061 A1* | 3/2010 | Crovella | H04L 43/16 726/23 |
| 2010/0153316 A1* | 6/2010 | Duffield | H04L 63/1416 706/12 |
| 2010/0271199 A1 | 10/2010 | Belov et al. | |
| 2010/0284282 A1 | 11/2010 | Golic | |
| 2010/0284283 A1 | 11/2010 | Golic | |
| 2012/0117254 A1 | 5/2012 | Ehrlich et al. | |
| 2015/0128263 A1 | 5/2015 | Raugas et al. | |
| 2015/0256431 A1 | 9/2015 | Buchanan et al. | |
| 2016/0028762 A1 | 1/2016 | Di Pietro et al. | |
| 2016/0080404 A1* | 3/2016 | Kohout | H04L 63/1425 726/23 |
| 2016/0218951 A1 | 7/2016 | Vasseur et al. | |
| 2016/0219067 A1 | 7/2016 | Han et al. | |
| 2017/0046700 A1 | 2/2017 | Nandakurnar et al. | |
| 2017/0053214 A1 | 2/2017 | Bellala et al. | |
| 2017/0103203 A1 | 4/2017 | Sharma et al. | |
| 2017/0279835 A1* | 9/2017 | Di Pietro | H04L 63/145 |
| 2018/0375888 A1 | 12/2018 | Christian | |
| 2019/0243872 A1 | 8/2019 | Komatsu et al. | |
| 2020/0128040 A1* | 4/2020 | Lazarescu | G06F 21/554 |
| 2020/0213341 A1 | 7/2020 | Wu et al. | |

FOREIGN PATENT DOCUMENTS

| | | |
|---|---|---|
| CN | 105871879 | 8/2016 |
| CN | 106101102 | 11/2016 |
| CN | 106204335 | 12/2016 |
| CN | 107481117 | 12/2017 |
| CN | 107491970 | 12/2017 |
| CN | 107515889 | 12/2017 |
| TW | 201108142 | 3/2011 |

OTHER PUBLICATIONS

Cao et al. "Voila: Visual Anomaly Detection and Monitoring with Streaming Spatiotemporal Data," IEEE, Oct. 1, 2017, 11 pages.

Crosby et al., "BlockChain Technology: Beyond Bitcoin." Sutardja Center for Entrepreneurship & Technology Technical Report, Oct. 16, 2015, 35 pages.

Extended Search Report in European Appln No. 18896044.7, dated. Jul. 17, 2020, 11 pages.

International Preliminary Report on Patentability in PCT Appln No. PCT/CN2018/116085, dated Jun. 30, 2020, 9 pages (with English translation).

International Search Report and Written Opinion in PCT Appln. No. PCT/CN2018/116085, dated Feb. 19, 2019, 11 pages (with partial English translation).

Nakamoto, "Bitcoin: A Peer-to-Peer Electronic Cash System." www.bitcoin.org, 2005, 9 pages.

Qian, "Anomaly detection for time series of network activity," Chinese Master's Theses Full-text Database (Engineering Science & Technology), No. 2, Feb. 15, 2016 (as translated by Google Translate on Mar. 20, 2020). (Year: 2020).

Qian, "Anomaly detection for time series of network activity," Chinese Master's Theses Full-text Database (Engineering Science & Technology), No. 2, Feb. 15, 2016, 81 pages (with English abstract).

Tianze 28, "Anomaly detection," CSDN, rettieved from URL <blog.csdn.net/u012328159/article/details/51462942>, May 20, 2016, 13 pages (with machine translation).

* cited by examiner

METHOD AND DEVICE FOR DETERMINING DATA ANOMALY

CROSS-REFERENCE TO RELATED APPLICATIONS

This application is a continuation of U.S. patent application Ser. No. 16/810,961, filed on Mar. 6, 2020, which is a continuation of PCT Application No. PCT/CN2018/116085, filed on Nov. 19, 2018, which claims priority to Chinese Patent Application No. 201711474464.6, filed on Dec. 29, 2017, and each application is hereby incorporated by reference in its entirety.

TECHNICAL FIELD

One or more embodiments of the present disclosure relate to the field of computer technology, and in particular, to a method and a device for determining data anomaly.

BACKGROUND

With the upgrade of the Internet, data interaction between different platforms is becoming more frequent. For example, a user submits a credit request to a bank or a financial platform. The bank or financial platform sends the user's request data to a comprehensive computing platform for comprehensive evaluation to determine whether to approve the user's credit request and the approved credit amount. However, in order to consider the security and confidentiality of their users, each platform often performs some privacy protection processing on the data before sending the data to other platforms for processing. The processed data will lose its business meaning. After the receiving platform receives these data, it is difficult to determine whether there is an anomaly in the data according to the business rules. For example, whether the data was attacked during the data transmission, whether the data was tampered with, or whether the user group has shifted.

Even in the same computing platform, data processing often goes through multiple links in the business chain. Data may also be abnormal during a certain business link or during the transmission between different business links, such as the system being attacked, the model being abnormal, and so on.

On the other hand, in the context of big data, the amount of data has grown exponentially, and business rules are constantly changing and inexhaustible. Therefore, only using business rules to discover data anomaly has a huge and incomplete workload.

Therefore, there is a demand for a more effective way to determine and warn about abnormalities in data.

SUMMARY

One or more embodiments of the present disclosure describe a method and a device, which can determine and warn about data anomaly without independently of the business meaning of the data.

According to a first aspect, a method for determining data anomaly is provided, including: obtaining a plurality of data packets within a predetermined time period, the plurality of data packets having the same data structure; obtaining a historical distribution of historical data having the same data structure as the data packets; comparing the plurality of data packets with the historical distribution; and determining whether data anomaly exists according to the comparison result.

According to an implementation, comparing the plurality of data packets with the historical distribution includes: substituting the plurality of data packets into the historical distribution, thereby obtaining a plurality of distribution state parameters of the plurality of data packets in the historical distribution; and comparing the plurality of distribution state parameters with a predetermined threshold related to the distribution state to determine a number of data packets having a distribution state parameter exceeding the threshold. Accordingly, determining whether data anomaly exists according to the comparison result includes determining whether data anomaly exists according to the number of data packets having a distribution state parameter exceeding the threshold.

According to an implementation, comparing the plurality of data packets with the historical distribution includes: determining a data distribution state of the plurality of data packets as a current distribution; and comparing the current distribution with the historical distribution.

According to an implementation, comparing the current distribution with the historical distribution includes: determining a distribution center of the current distribution; obtaining a distribution center of the historical distribution; and determining an offset between the distribution center of the current distribution and the distribution center of the historical distribution. Accordingly, determining whether data anomaly exists according to the comparison result includes determining that data anomaly exists in response to determining that the offset exceeds a predetermined offset threshold.

According to another implementation, comparing the current distribution with the historical distribution includes: determining a distribution state parameter of a randomly selected data packet in the current distribution, denoted as a first parameter; determining a distribution state parameter of the randomly selected data packet in the historical distribution, denoted as a second parameter; and determining a difference value between the first parameter and the second parameter. Correspondingly, determining whether data anomaly exists according to the comparison result includes determining that data anomaly exists in response to determining that the difference value exceeds a predetermined difference threshold.

According to an implementation, the historical distribution is a historical probability distribution obtained by processing the historical data with a hybrid Gaussian model; correspondingly, the current distribution is embodied as a current probability distribution obtained by processing the plurality of current data packets with a hybrid Gaussian model; the distribution state parameter can be embodied as a probability value; and the distribution center is embodied as a peak position of the probability distribution curve.

According to another implementation, the historical distribution is a historical clustering distribution obtained with a clustering algorithm for the historical data; correspondingly, the current distribution is embodied as a current clustering distribution obtained by processing the plurality of current data packets with the same clustering algorithm; the distribution state parameters can be embodied as a distance between the position of the data packet in the clustering distribution space and the corresponding clustering center; the distribution center is embodied as the center position of the clustering distribution.

According to a second aspect, a device for determining data anomaly is provided, including: a data packet obtaining unit configured to obtain a plurality of data packets within a predetermined time period, the plurality of data packets having the same data structure; a history obtaining unit configured to obtain a historical distribution of historical data having the same data structure as the data packets; a comparing unit configured to compare the plurality of data packets with the historical distribution; and a determining unit configured to determine whether data anomaly exists according to the comparison result.

According to a third aspect, a computer-readable storage medium is provided on which a computer program is stored, when the computer program is executed on a computer, the computer executes the method of the first aspect.

According to a fourth aspect, there is provided a computing device including a memory and a processor, wherein the memory stores executable codes, and when the processor executes the executable codes, the processor implements the method of the first aspect.

With the method and device provided in some embodiments of the present disclosure, the currently obtained data packet is compared with the historical distribution obtained based on historical data statistics, and whether the current data packet has data anomaly is determined according to the comparison result. In this way, it is possible to effectively determine and warn about data abnormalities independently of the business meaning of the data.

BRIEF DESCRIPTION OF THE DRAWINGS

In order to explain the technical solution of the embodiments of the present disclosure more clearly, the drawings used in the description of the embodiments will be briefly introduced below. Apparently, the drawings in the following description are only some implementations of the present disclosure. For example, for those of ordinary skill in the art, other drawings can be obtained based on these drawings without paying creative labor.

DETAILED DESCRIPTION OF THE EXAMPLES

The solutions provided in the present disclosure are described below with reference to the drawings.

Figure 1:
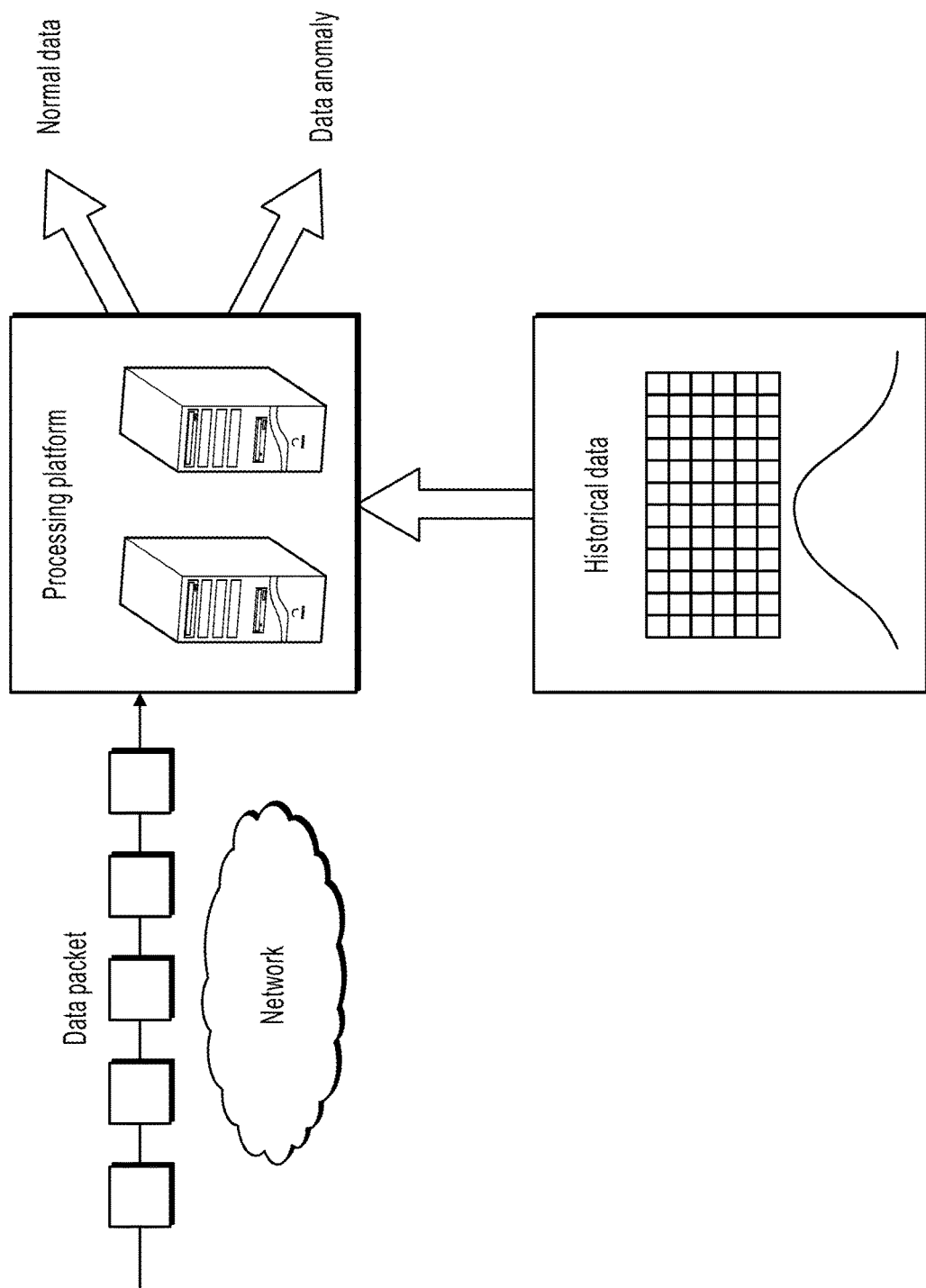
FIG. 1 shows a schematic diagram of an embodiment disclosed in the present disclosure.

FIG. 1 is a schematic diagram of an embodiment disclosed in the present disclosure. In FIG. 1, a computing platform, such as an Alipay server, obtains a plurality of data packets within a predetermined time period, such as a credit request data packet in which a user requests a credit. These data packets have the same data structures, for example, have the same fields. The content of the fields can include user's age, gender, income, credit amount, and so on. On the other hand, the computing platform also obtains a historical distribution of historical data with the same data structures, which can be composed of a large number of similar data packets received in a relatively longer time period before. Then, the computing platform compares the plurality of data packets with the historical distribution, and determines whether data anomaly exists according to the comparison result. If there is no data anomaly, the computing platform can continue to process the data or send the data to the next business link. If it is determined that there is an anomaly in the data, an early warning can be initiated to notify a relevant personnel to analyze the cause of the anomaly in the data and trigger a relevant solution. The specific implementation process of determining data anomaly is described below.

Figure 2:
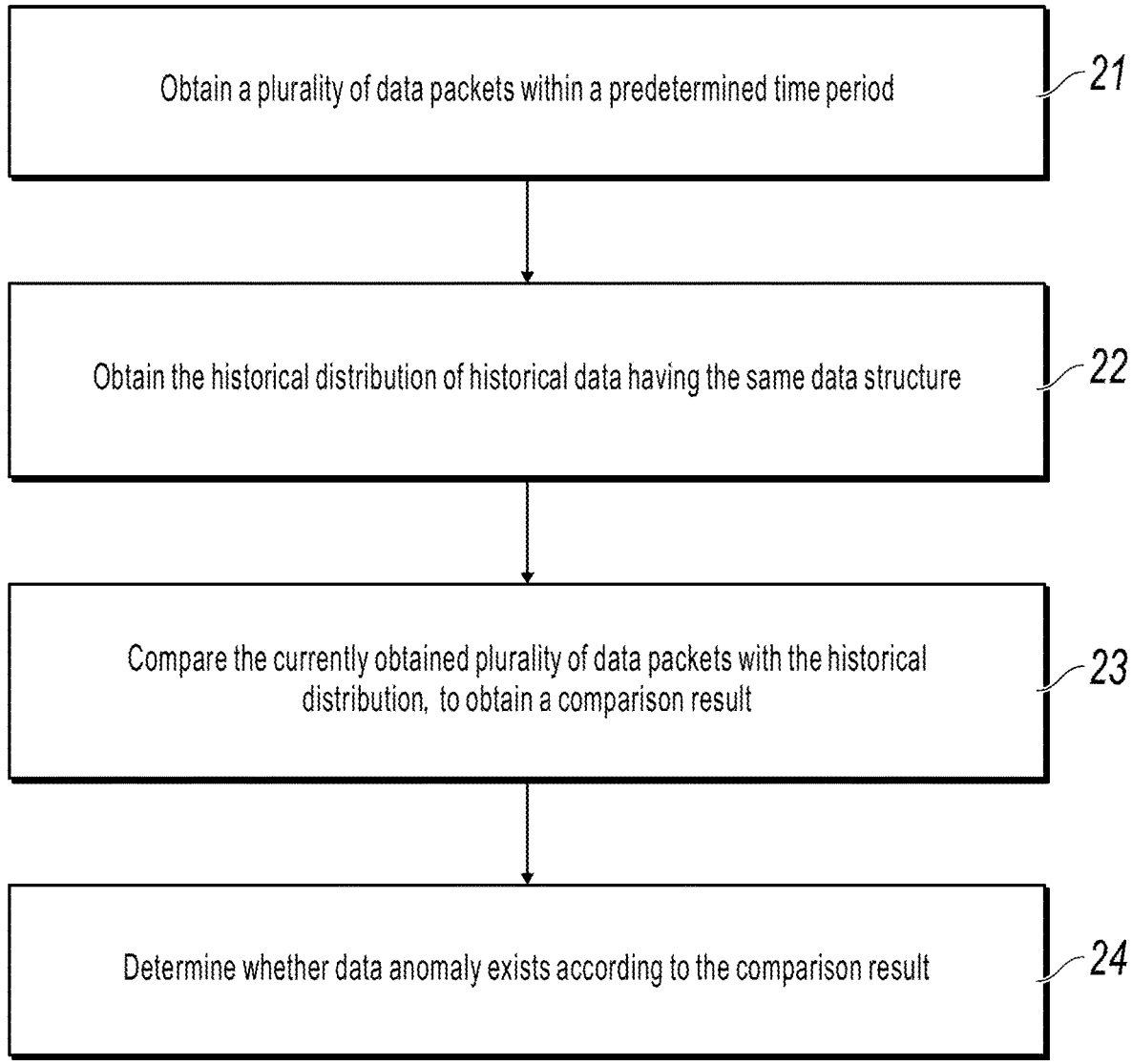
FIG. 2 shows a flowchart of a method according to an embodiment.

FIG. 2 shows a method flowchart according to an embodiment. The execution entity of the method may be any computing platform with computing and processing capabilities, such as a server. As shown in FIG. 2, the method includes: step 21, obtaining a plurality of data packets within a predetermined time period, the plurality of data packets having the same data structure; step 22, obtaining a history distribution of historical data having the same data structure; step 23, comparing the plurality of data packets with the historical distribution; step 24, determining whether data anomaly exists according to the comparison result. The following describes the execution manner of the above steps with specific examples.

First, at step 21, a plurality of data packets is obtained within a predetermined time period.

In one embodiment, the plurality of data packets are data packets received from an external institution, such as a user's credit request data packet received by a Alipay server from a bank or a financial institution. At this time, the subsequent steps can be used to determine whether data anomaly exists in the data packet transmitted from the external institution. Such data anomaly may be caused by attacks, tampering during data transmission, or user group shifts.

In another embodiment, the plurality of data packets are data packets generated by a certain service link in a data processing service chain. For example, for a credit request data packet received from an external institution, the credit request data packet needs to be processed in a plurality of business links, including field analysis, dimensionality reduction, model calculation, and so on. At this time, subsequent analysis can be performed on the data packets generated in any business link. Through subsequent analysis, it can be determined whether there is any data anomaly in the data packets of this service link. The data anomaly in the data packets of a certain business link may be caused by a problem in data transmission between business links, or a problem in the system or model of the business link. Therefore, determining the anomaly of the data packets of the intermediate business links can also help determine whether there is anomaly in the system or model.

It can be understood that the plurality of data packets described above have the same data structures. More specifically, each data packet can have the same fields. In one example, the above data packet is a credit request data packet, and the fields of each data packet at this time may include the user's age, gender, income, credit amount, and so on. In another example, the data packet is a record of user operations and is used to analyze a user's behavior pattern. At this time, the fields of each data packet may include user ID, operation behavior, operation object, operation time, and so on.

In one embodiment, the plurality of data packets obtained at step 21 are data packets within a predetermined time period from the current time. The above predetermined time period may be set to a shorter time period, so that the obtained plurality of data packets are recently generated data packets. For example, when the amount of data is relatively large, the predetermined time period may be preset to 0.5 s or 1 s; when the amount of data is relatively small, the predetermined time period may be preset to 30 s or 1 min. The number of obtained data packets can also be selected according to business requirements. In one embodiment, all data packets within the predetermined time period are obtained. In another embodiment, a predetermined number of data packets are obtained within the predetermined time period.

After obtaining the above-mentioned plurality of data packets with the same structure, on the other hand, at step 22, the historical distribution of historical data is obtained. It can be understood that the above historical data has the same data structure as the data packet obtained at step 21. And, generally, the historical data includes a large number of similar data packets received in a long time period previously, such as a week or a month. In one embodiment, the historical data and the data packet obtained at step 21 have the same data sources. For example, in a case where the data packet at step 21 is a credit request data packet from an external institution, correspondingly, the above-mentioned historical data is also a credit request data packet received from an external institution and received within a relatively long time period. When the data packet at step 21 is a data packet generated by an intermediate service link, correspondingly, the above historical data is a data packet generated by the same service link within a longer time period previously.

The historical distribution of historical data can be obtained by performing statistics and calculations on historical data.

Next, at step 23, the currently obtained plurality of data packets is compared with the historical distribution; and at step 24, it is determined whether data anomaly exists in the current data packet according to the comparison result.

There are various implementations for comparing the current data packet with the historical distribution at step 23. Correspondingly, at step 24, determining is made based on the comparison results generated by different comparison methods.

Figure 3:
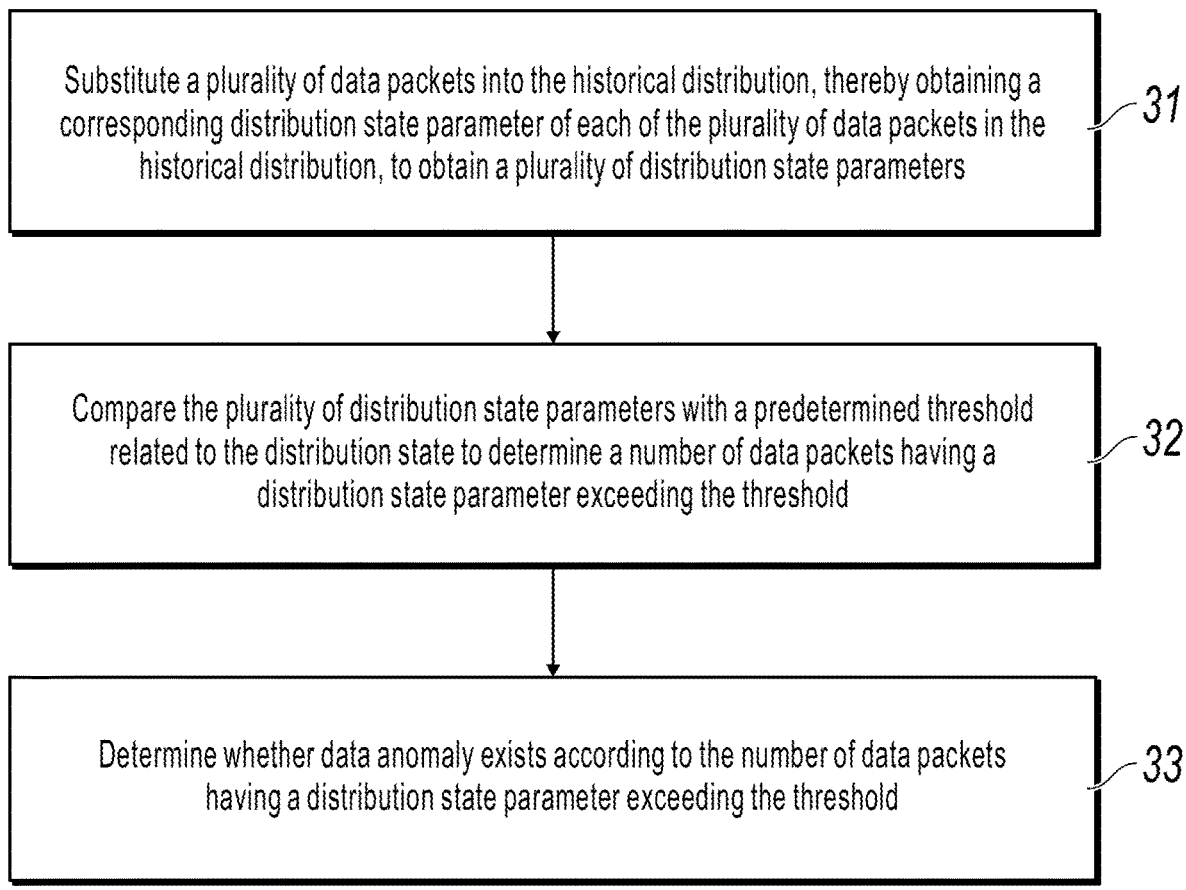
FIG. 3 shows a flowchart of a comparing and determining process according to an embodiment.

In one implementation, the comparison is performed by substitution. FIG. 3 shows a flowchart of a comparing and determining process according to an embodiment. It can be understood that the process shown in FIG. 3 is a sub-step of steps 23 and 24 in FIG. 2. As shown in FIG. 3, the process includes the following steps. At step 31, a plurality of data packets are substituted into the historical distribution, thereby obtaining a corresponding distribution state parameter of each of the plurality of data packets in the historical distribution, to obtain a plurality of distribution state parameters; at step 32, the plurality of distribution state parameters are compared with a predetermined threshold related to the distribution state to determine a number of data packets exceeding the threshold; then, at step 33, it is determined whether data anomaly exists according to the number of data packets exceeding the threshold.

The above process is to substitute the currently obtained plurality of data packets into the historical distribution to determine the distribution states of the plurality of data packets in the historical distribution. If a large number (exceeding the threshold) of abnormal states occurs, It is considered that data anomaly currently exists.

As mentioned above, historical distribution is the state of data distribution obtained by performing statistics and calculations on historical data. Different algorithms can be used to obtain historical distribution based on historical data. In the following, an implementation of the flow of FIG. 3 will be described with respect to different forms of historical distribution using a Gaussian mixture model and a clustering algorithm for example.

In one embodiment, the historical distribution is a historical probability distribution obtained by processing historical data using a Gaussian Mixture Model (GMM). It can be understood that the hybrid Gaussian model GMM is a model that accurately quantifies objects with a Gaussian probability density function. GMM can decompose an object into several forms based on a Gaussian probability density function. The Gaussian probability density function usually takes the form of a normal distribution curve. As mentioned earlier, both the currently obtained data packets and historical data have the same data structure, which contains several fields. In one example, a hybrid Gaussian model can be used to decompose the data field as a dimension to determine the mixed Gaussian probability density function as the historical probability distribution.

When the historical distribution is expressed as a Gaussian probability distribution, the process of FIG. 3 may be performed as follows. At step 31, the currently obtained plurality of data packets are substituted into the historical probability distribution, and the probability values of the plurality of data packets respectively in the historical probability distribution are obtained to obtain a plurality of probability values. That is, when the historical distribution is a Gaussian probability distribution, the distribution state parameter is expressed as a distribution probability value. Assuming that N data packets are obtained, then at step 31, it can be determined that the probability values of the N data packets in the historical probability distribution are $p_1$, $p_2$, ..., $p_N$, respectively.

At step 32, the determined a plurality of probability values are respectively compared with a predetermined probability threshold, and a number of data packets having a probability value smaller than the probability threshold is determined, denoted as a first number. Generally, the predetermined probability threshold is a relatively small probability value $p_0$. The size of the probability threshold $p_0$ can be set according to business requirements. In this step, the number M1 (M1<=N) of the probability values $p_1$, $p_2$, ... $p_N$ having a probability value smaller than the probability threshold $p_0$ is determined. That is, it is determined how many packets in the current data packets are "small probability" packets.

Next, at step 33, it is determined whether data anomaly exists according to the first number M1. More specifically, in one example, if the first number M1 exceeds a predetermined number threshold M0, it is determined that data anomaly exists. That is, once more than M0 data packets of the currently obtained N data packets are "small probability" data packets, it is considered that anomaly currently exists. In another example, if a ratio M1/N of the first number M1 to the number N of the plurality of data packets exceeds a predetermined ratio threshold, it is determined that data anomaly exists. That is, once N data packets exceed a predetermined percentage of data packets as "small probability" data packets, it is considered that data anomaly currently exists.

In this way, the number or proportion of "small probability" data packets in the currently obtained data packets is determined. When the number or proportion exceeds a certain threshold, it can be determined that data anomaly currently exists.

The following describes the implementation of FIG. 3 when the historical distribution is a cluster distribution. It can be understood that the clustering algorithm is an algorithm for performing similarity analysis and data statistics on a plurality of samples. For data packets with the same data structure, the fields in the data packets can be used as dimensions to map each data packet to a point in a multi-dimensional space, and then a clustering algorithm is used to divide and cluster the plurality of data packets. During the clustering process, a hierarchical clustering algorithm, such as the BIRCH algorithm, CURE algorithm, or the like, or a density-based clustering algorithm, such as the DBSCAN algorithm, the OPTICS algorithm, and so on, and other possible clustering algorithms can be adopted.

When the historical distribution is embodied as a clustering distribution, the process of FIG. 3 may be specifically performed as follows. At step 31, the positions of the currently obtained plurality of data packets in the distribution space of the historical clustering distribution are determined, to obtain a plurality of positions, and distance between each of the plurality of positions and a corresponding cluster center position of the historical clustering distribution is determined, to obtain a plurality of distances. As mentioned earlier, each data packet can be mapped to a point in a multi-dimensional space composed of fields as dimensions, which is also the distribution space of the historical clustering distribution. Accordingly, the positions $P_1$, $P_2$, ... $P_N$ of the currently obtained N data packets in the space of the historical clustering distribution can be determined through the above mapping. Further, the position of the cluster center in the historical clustering distribution may be determined, and then the distances $D_1$, $D_2$, ... $D_N$ respectively between the positions $P_1$, $P_2$, ... $P_N$ and the cluster center position corresponding to the historical clustering distribution are determined. It can be understood that the distance is a distance between multi-dimensional vectors in the multi-dimensional space.

Next, at step 32, the plurality of distances are respectively compared with a preset distance threshold to determine a number of distances exceeding the preset distance threshold, denoted as a second number. Generally, the cluster center is located in an area with the most densely distributed data. The further away from the cluster center, the lower the frequency or probability of corresponding data packet existing is. Therefore, the predetermined distance threshold can be set to a relatively large distance Do. The size of the distance threshold $D_0$ can be set according to business requirements. Accordingly, in this step, the number M2 (M2<=N) of the distances $D_1$, $D_2$, ... $D_N$ that is larger than the distance threshold Do is determined. That is, it is determined how many of the currently obtained data packets are data packets far from the cluster center.

Then, at step 33, it is determined whether data anomaly exists according to the second number. Specifically, in one example, if the second number M2 exceeds a predetermined number threshold M0, it is considered that data anomaly exists. That is, once there are more than M0 data packets in the N data packets currently far away from the cluster center, it is considered that data anomaly currently exists. In another example, if a ratio M2/N of the second number M2 to the number N of the plurality of data packets exceeds a predetermined ratio threshold, it is determined that data anomaly exists. That is, once there are more than a predetermined percentage of the currently obtained N data packets that are away from the cluster center, it is considered that data anomaly currently exists.

In this way, the number or proportion of data packets that are far away from the cluster center in the currently obtained data packets is determined. When the number or proportion exceeds a certain threshold, it can be determined that data anomaly currently exists.

The above examples of mixing the Gaussian distribution and the clustering distribution describe an implementation of comparing by substituting the current data packet into the historical distribution. In the case of a large number of currently obtained data packets, for example, exceeding a certain number (such as 200), the distribution states of the currently obtained plurality of data packets can be further determined as the current distribution, and the current distribution is compared with the historical distribution, to determine whether data anomaly exists.

Figure 4:
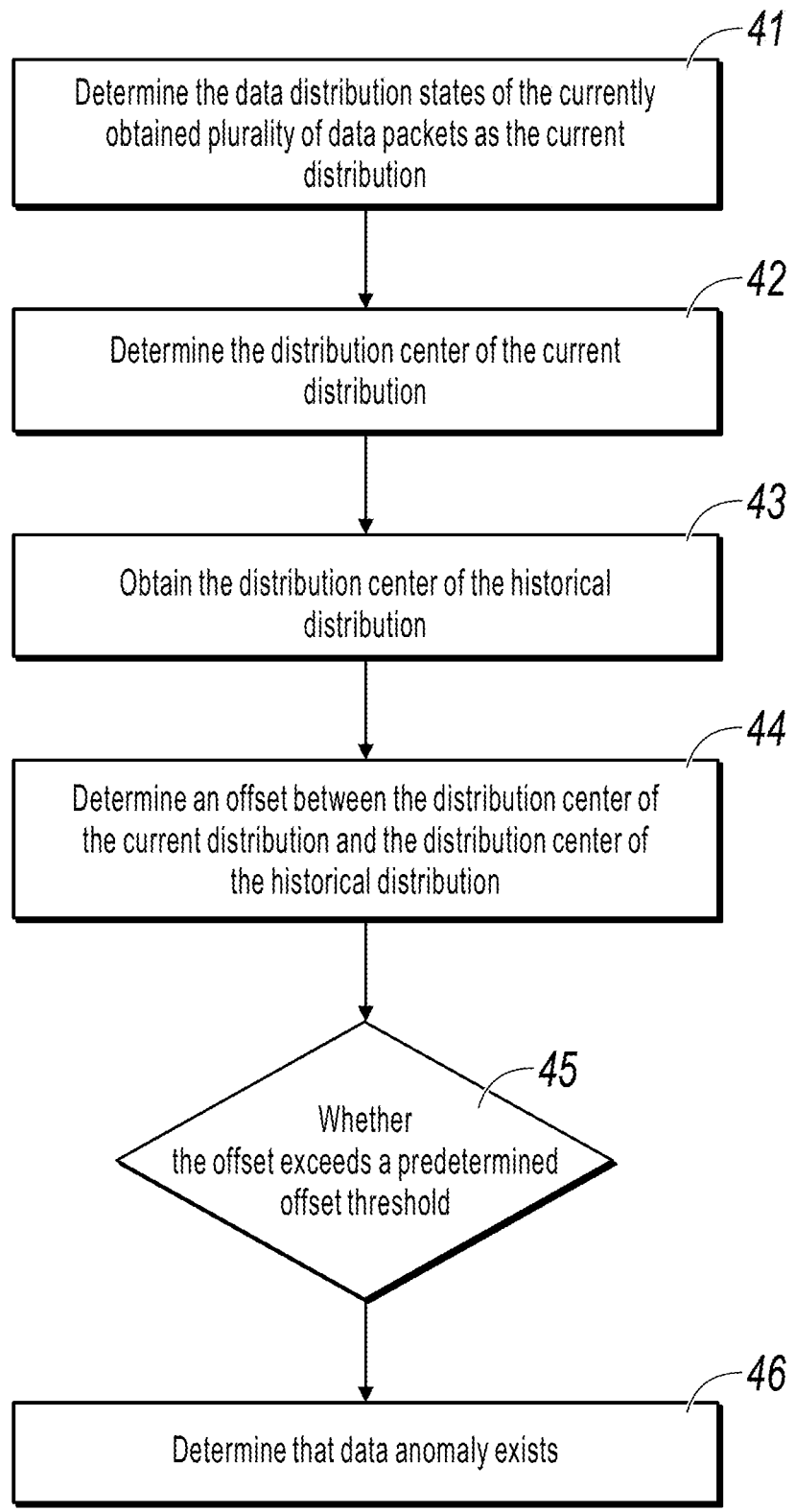
FIG. 4 shows a flowchart of a comparing and determining process according to another embodiment.

Specifically, FIG. 4 shows a flowchart of a comparing and determining process according to another embodiment. It can be understood that the process shown in FIG. 4 is a sub-step of steps 23 and 24 in FIG. 2. As shown in FIG. 4, at step 41, the data distribution states of the currently obtained plurality of data packets are determined as the current distribution; at step 42, the distribution center of the current distribution is determined; at step 43, the distribution center of the historical distribution is obtained; at step 44, an offset between the distribution center of the current distribution and the distribution center of the historical distribution is determined; at step 45, it is determined whether the offset exceeds a predetermined offset threshold; and when the offset exceeds the predetermined offset threshold, at step 46, it is determined that data anomaly exists.

The above process compares the distribution center of the current distribution with the distribution center of the historical distribution. When an offset between the two exceeds a predetermined threshold, it is considered that data anomaly currently exists. In the following, an implementation of the flow of FIG. 4 will be described with respect to different forms of historical distribution using a Gaussian mixture model and a clustering algorithm for example.

In one embodiment, the historical distribution is a historical probability distribution obtained by processing historical data with a hybrid Gaussian model. Correspondingly, at step 41, the same hybrid Gaussian model is used for processing the currently obtained plurality of data packets to obtain the mixed Gaussian distribution of the current data packet as the current probability distribution. Next, at step 42, a first peak position P1 is determined, where the first peak position is a peak position of a curve corresponding to the current probability distribution. At step 43, a second peak position P2 is obtained, where the second peak position is a peak position of a curve corresponding to the historical probability distribution. In other words, in the case of a Gaussian probability distribution, the distribution center is embodied as the peak position of the probability distribution curve.

Then, at step 44, a position offset ΔP between the first peak position P1 and the second peak position P2 is determined. At step 45, it is determined whether the position offset ΔP exceeds a predetermined offset threshold, and if the position offset exceeds a predetermined threshold, it is determined that data anomaly currently exists.

Figure 5:
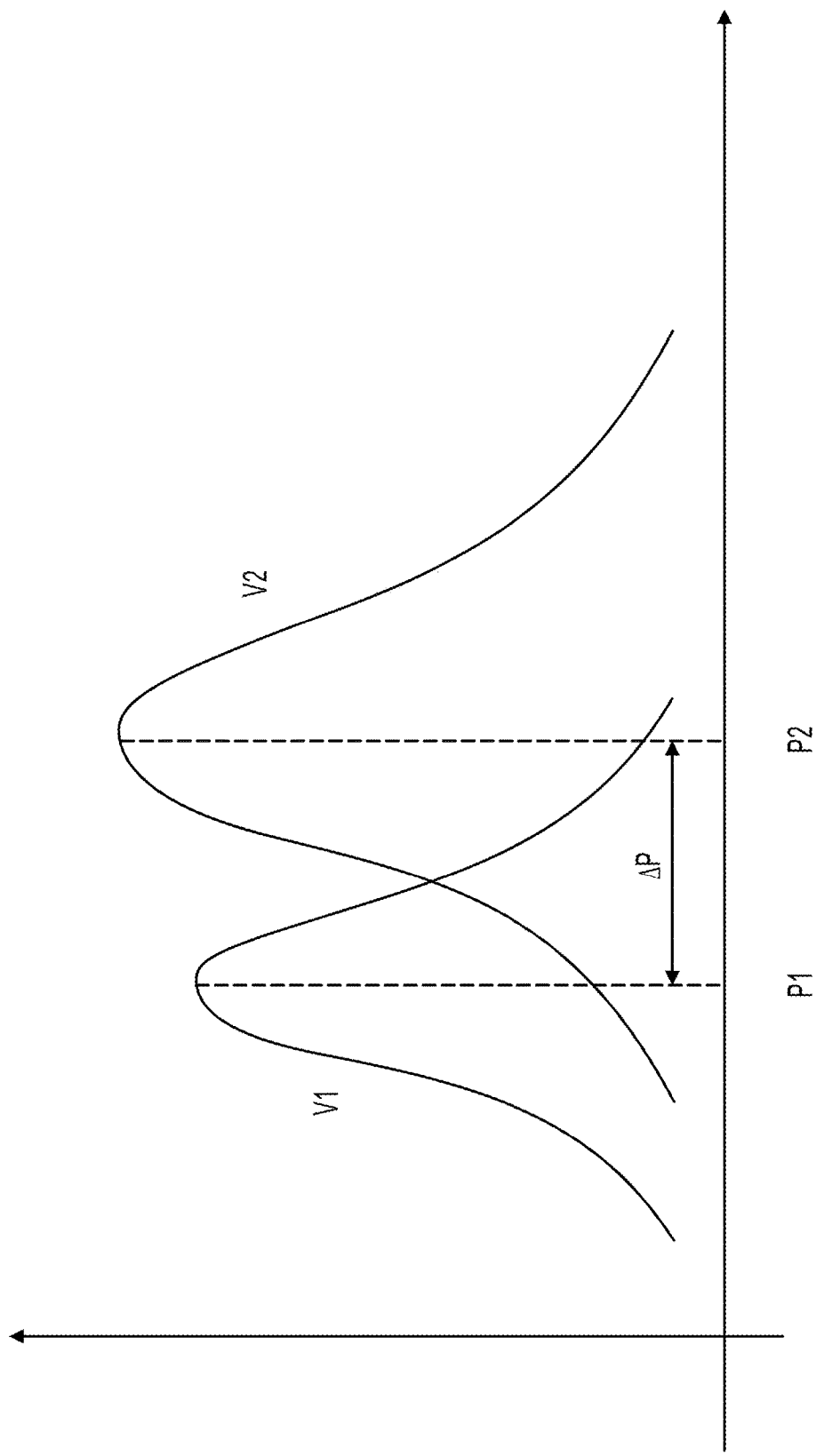
FIG. 5 shows a schematic diagram of comparing peak positions.

FIG. 5 shows a schematic diagram of comparing peak positions described above. In FIG. 5, V1 is a curve schematically showing the current probability distribution, and V2 is a curve schematically showing the historical probability distribution. It can be seen that the peak position of the curve V1 is schematically shown as P1, and the peak position of the curve V2 is schematically shown as P2. If the offset ΔP between the peak positions P1 and P2 is larger than a preset threshold, then it can be considered that the current probability distribution has changed greatly compared to the historical probability distribution, so data anomaly may exist currently.

It can be understood that since a data packet may contain more fields, correspondingly, the hybrid Gaussian model may perform data statistics based on more dimensions. The actual probability distribution curve is a three-dimensional and multi-dimensional curve. FIG. 5 is just a simplified illustration.

The above has described the implementation of comparing peak positions shown in FIG. 4 in the case of Gaussian distribution. When the historical distribution is a clustering distribution obtained with a clustering algorithm, the process of FIG. 4 may be similarly performed. Specifically, at step 41, the same clustering algorithm is used to determine the clustering distribution of the currently obtained plurality of data packets as the current clustering distribution. At step 42, a first center position is determined, and the first center position is a center position of a cluster corresponding to the current cluster distribution; at step 43, a second center position is obtained, and the second center position is the center position of the cluster corresponding to the historical cluster distribution. In other words, in the case of cluster distribution, the distribution center is embodied as the center position of the cluster distribution. It can be understood that although different clustering algorithms can cluster the data into different clusters, the center of the entire clustering distribution can always be determined by clustering or searching for the center of gravity. In this way, the first center position and the second center position can be determined respectively.

Next, at step 44, a distance D between the first center position and the second center position is determined. It can be understood that the distance may be a distance between multi-dimensional points or multi-dimensional vectors in a multi-dimensional space.

Then, at step 45, it is determined whether the distance D exceeds a predetermined distance threshold. If D exceeds the distance threshold, it is determined that data anomaly exists.

In the above manner, the center position of the current clustering distribution is compared with the center position of the historical clustering distribution. If the center of the clustering distribution is greatly shifted, it is considered that data anomaly currently exists.

Figure 6:
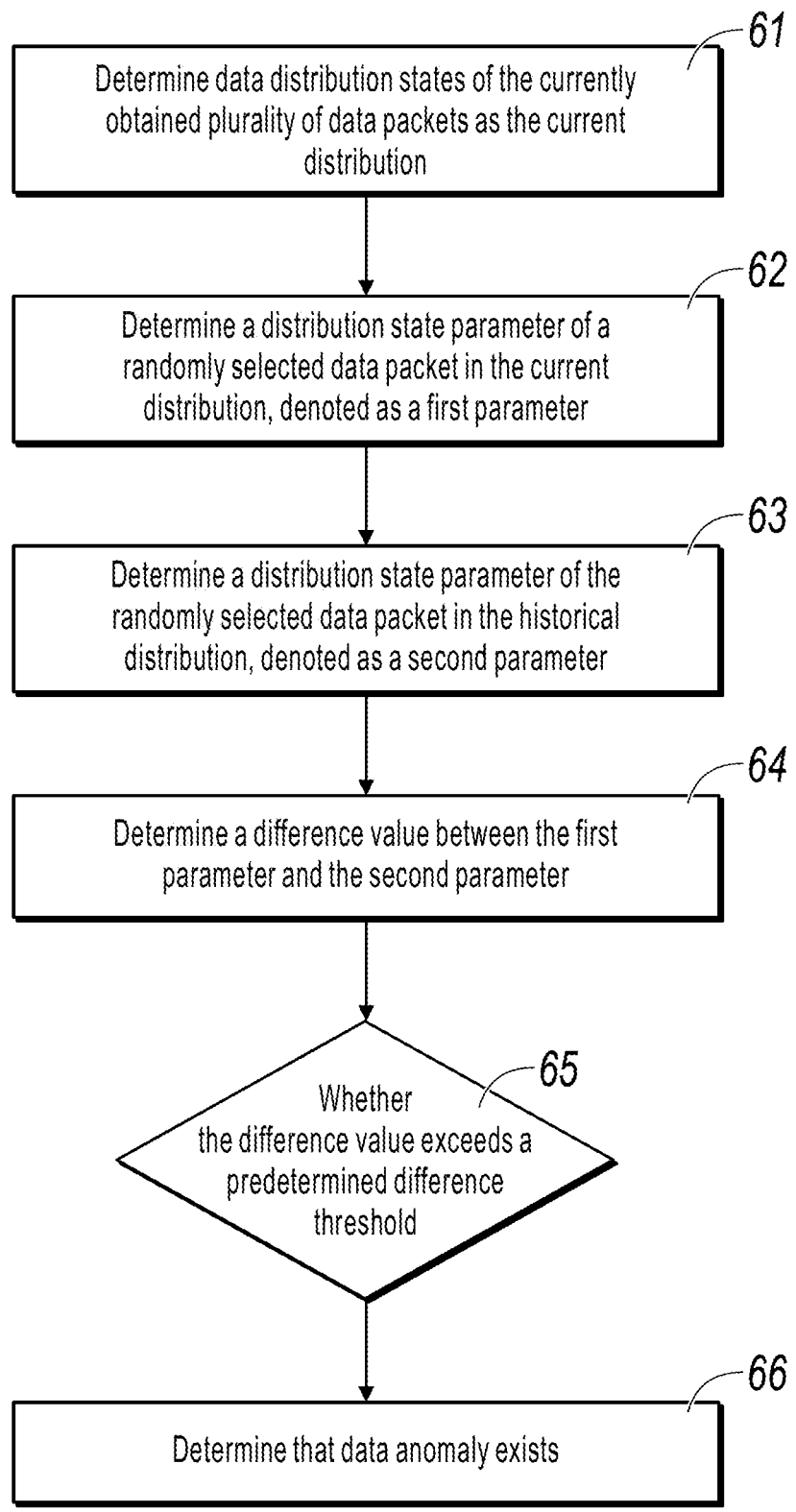
FIG. 6 shows a flowchart of a comparing and determining process according to yet another embodiment.

In addition to comparing the distribution centers, it is also possible to randomly select a sample and compare the state parameters of the same sample in different distributions, to determine whether data anomaly exists. FIG. 6 shows a flowchart of a comparing and determining process according to another embodiment. It can be understood that the process shown in FIG. 6 is a sub-step of steps 23 and 24 in FIG. 2. As shown in FIG. 6, at step 61, data distribution states of the currently obtained plurality of data packets are determined as the current distribution; at step 62, a distribution state parameter of a randomly selected data packet in the current distribution is determined, denoted as a first parameter; at step 63, a distribution state parameter of the randomly selected data packet in the historical distribution is determined, denoted as a second parameter; at step 64, a difference value between the first parameter and the second parameter is determined; and at step 65, it is determined whether the difference value exceeds a predetermined difference threshold; and when the difference value exceeds the predetermined difference threshold, at step 66, it is determined that data anomaly exists.

The above process randomly selects a sample, compares the respective state parameters of the sample in the current distribution and in the historical distribution, and when the difference between the two exceeds a predetermined threshold, it is considered that data anomaly currently exists. In the following, an implementation of the flow of FIG. 6 will be described with respect to different forms of historical distribution also using a Gaussian mixture model and a clustering algorithm for example.

In one embodiment, the historical distribution is a historical probability distribution obtained by processing historical data with a hybrid Gaussian model. Accordingly, the flow of FIG. 6 may be performed as follows. At step 61, the hybrid Gaussian model is used to determine the mixed Gaussian probability distribution of the currently obtained plurality of data packets as the current probability distribution. At step 62, an occurrence probability of the randomly selected data packet in the current probability distribution is determined, denoted as a first probability p1; at step 63, an occurrence probability of the randomly selected data packet in the historical probability distribution is determined, denoted as a second probability p2. Then, at step 64, a probability difference value Δp between the first probability p1 and the second probability p2 is determined. At step 65, it is determined whether the probability difference value Δp exceeds a predetermined difference threshold, and if the predetermined difference threshold is exceeded, it is determined that data anomaly currently exists.

Figure 7:
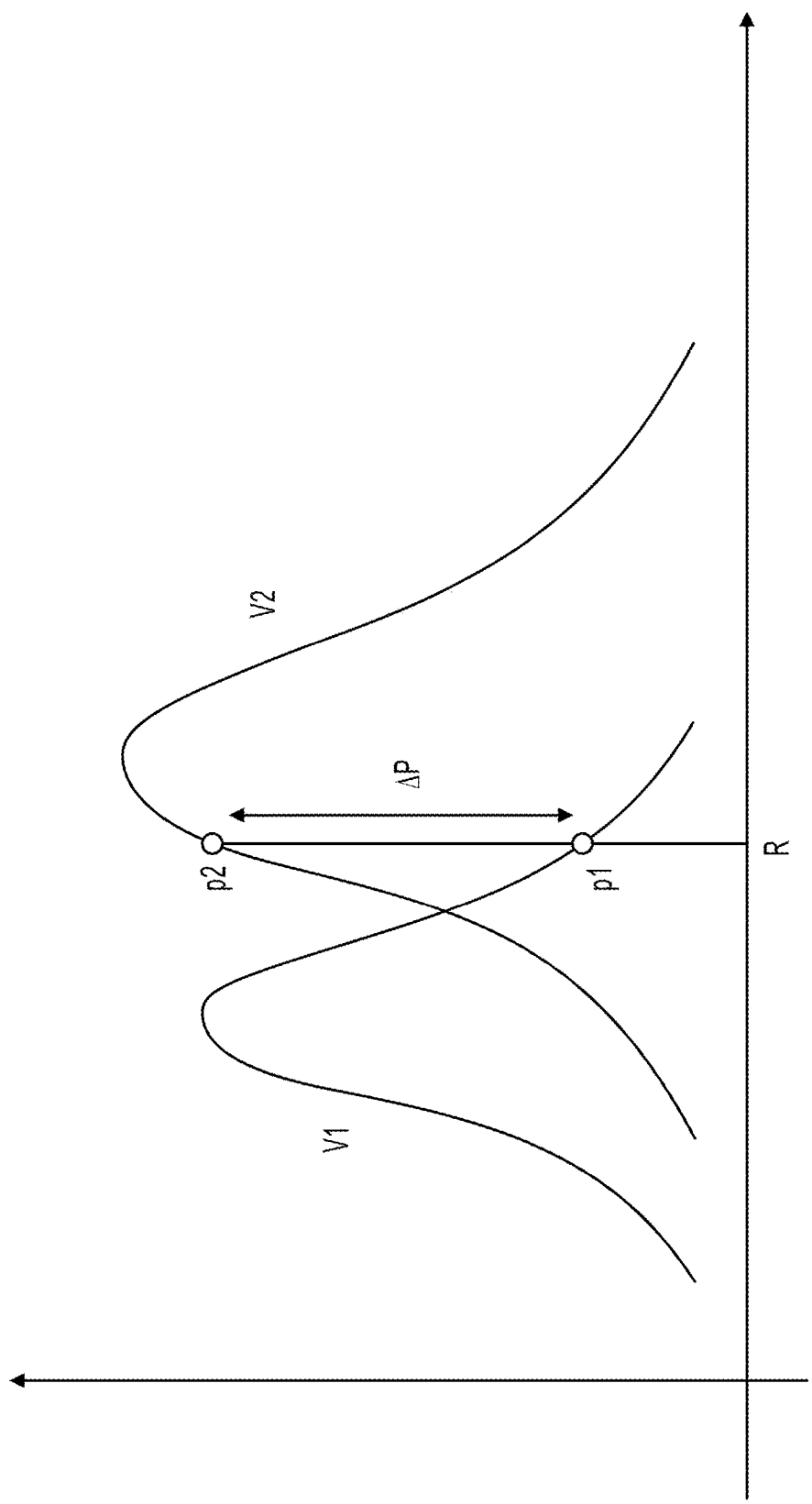
FIG. 7 shows a schematic diagram of comparing probability values.

FIG. 7 shows a schematic diagram of comparing probability values mentioned above. In FIG. 7, V1 is a curve schematically showing the current probability distribution, and V2 is a curve schematically showing the historical probability distribution. It can be seen that the corresponding probability of the randomly selected data packet R in the current probability distribution curve V1 is p1, and the corresponding probability in the historical probability distribution curve V2 is p2. If the difference value Δp between the probabilities p1 and p2 is larger than a preset threshold, then it can be considered that the current probability distribution has changed greatly compared to the historical probability distribution, so data anomaly may exist currently.

It can be understood that the hybrid Gaussian model is generally based on multi-dimensional data statistics, and the actual distribution curve is a three-dimensional and multi-dimensional curve. FIG. 7 is just a simplified illustration.

The above has described the implementation of state parameters of the same sample shown in FIG. 6 in the case of Gaussian distribution. In the case where the historical distribution is a clustering distribution obtained with a clustering algorithm, the process of FIG. 6 may be similarly performed. Specifically, at step 61, the same clustering algorithm is used to determine the clustering distribution of the currently obtained plurality of data packets as the current clustering distribution. At step 62, a distance between a position of the randomly selected data packet in the current clustering distribution and the center of the cluster corresponding to the current clustering distribution is determined, denoted as a first distance D1; at step 63, a distance between a position of the randomly selected data packet in the historical clustering distribution and the center of the cluster corresponding to the current clustering distribution is determined, denoted as a first distance D2. It can be understood that the randomly selected data packet can be mapped to a point in the cluster distribution space, and the first distance D1 and the second distance D2 each is a distance between the point mapped by the randomly selected data packet and the center of the corresponding cluster distribution. The distance can be obtained by calculating the distance between multi-dimensional vectors in a multi-dimensional space.

At step 64, a distance difference value ΔD between the first distance D1 and the second distance D2 is determined. At step 65, it is determined whether the distance difference value exceeds a predetermined difference threshold, and if it exceeds the difference threshold, it is determined that data anomaly currently exists.

In the above method, the distance of the same sample from the center in the current clustering distribution and from the center in the historical clustering distribution are compared. If there is a large deviation between the two, it is considered that there is a large deviation between the current clustering distribution and the history clustering distribution, and it is determined that data anomaly currently exists.

Although the above has been described with reference to hybrid Gaussian model and clustering distribution, the historical distribution is not limited to these two examples. Other algorithms can also be used, as long as the algorithm can analyze the statistics to obtain the distribution rule of historical data. In addition, although the manner of comparing the currently obtained data packet with the historical distribution has been described above with reference to the specific processes of FIG. 3, FIG. 4, and FIG. 6, it can be understood that the manner of comparison is not limited to these specifically described examples. According to the specific form of historical distribution, other distribution state parameters can also be compared.

With the method described in the above embodiment, even if the currently obtained data packet is protected with privacy and loses business meaning, through statistical distribution of historical data, the current obtained data packet can be compared with the historical distribution to determine whether data anomaly exists, so that the data anomaly can be found more effectively, and then early warning and early intervention can be performed.

Figure 8:
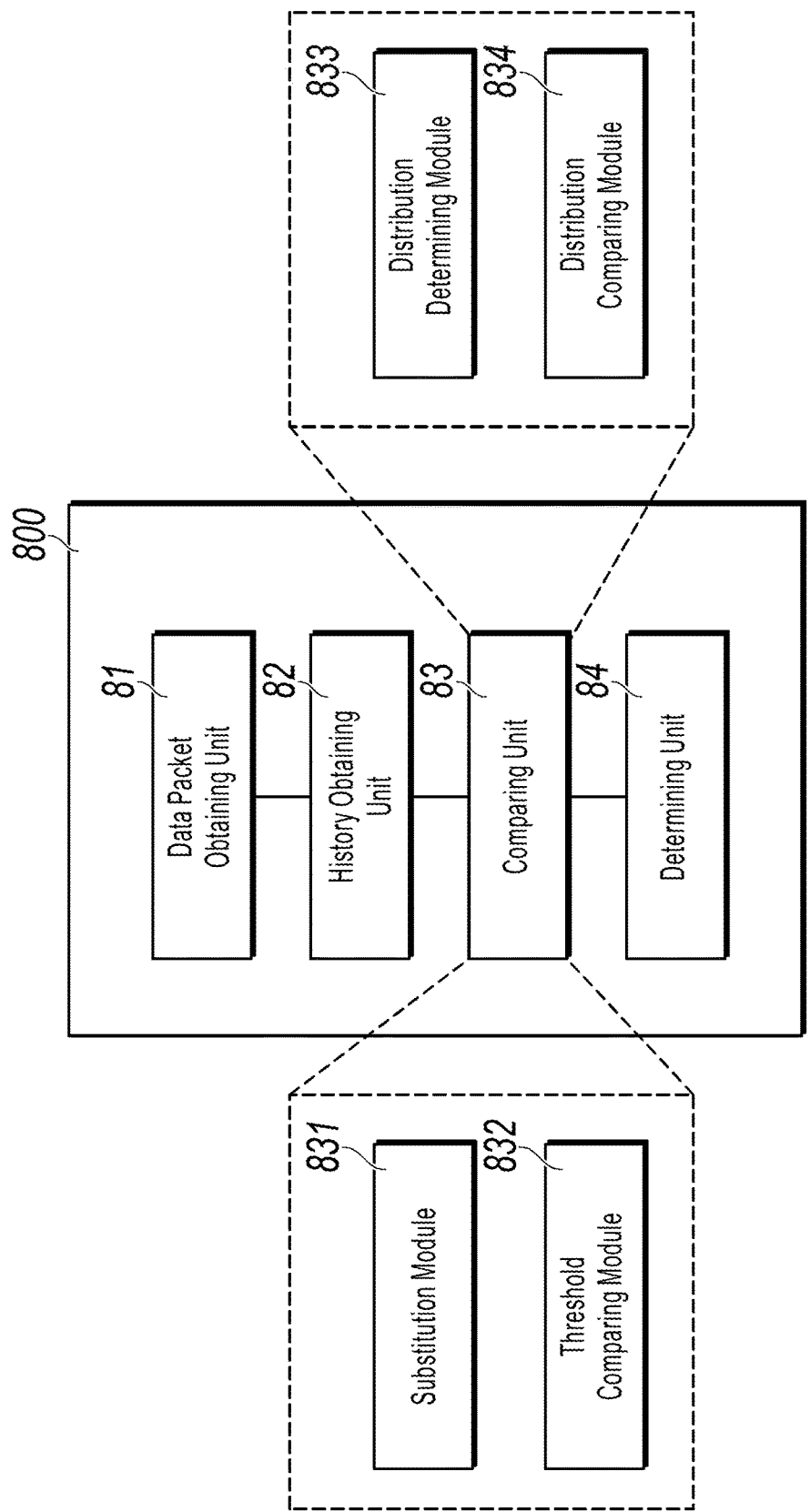
FIG. 8 shows a schematic block diagram of a determining device according to an embodiment.

According to an embodiment of another aspect, a device for determining data anomaly is also provided. FIG. 8 shows a schematic block diagram of a determining device according to an embodiment. As shown in FIG. 8, the determining device 800 includes: a data packet obtaining unit 81, configured to obtain a plurality of data packets within a predetermined time period, the plurality of data packets having the same data structure; a history obtaining unit 82, configured to obtain a historical distribution of historical data having the same data structure as the data packets; a comparing unit 83, configured to compare the plurality of data packets with the historical distribution; and a determining unit 84, configured to determine whether data anomaly exists according to the comparison result.

In one embodiment, the comparing unit 83 includes (shown by a dotted line on the left): a substitution module 831 configured to substitute the plurality of data packets into the historical distribution, thereby obtaining a corresponding distribution state parameter of each of the plurality of data packets in the historical distribution, to obtain a plurality of distribution state parameters; a threshold comparing module 832 configured to compare the plurality of distribution state parameters with a predetermined threshold related to the distribution state to determine a number of data packets having a distribution state parameter exceeding the threshold. Correspondingly, the determining unit 84 is configured to determine whether data anomaly exists according to the number of data packets having a distribution state parameter exceeding the threshold.

In another embodiment, the comparing unit 83 includes (shown by a dotted line on the right): a distribution determining module 833 configured to determine a data distribution state of the plurality of data packets as a current distribution; and a distribution comparing module 834, configured to compare the current distribution with the historical distribution.

In one embodiment, the distribution comparing module 834 is configured to: determine a distribution center of the current distribution, and obtain a distribution center of the historical distribution; determine an offset between the distribution center of the current distribution and the distribution center of the historical distribution. Correspondingly, the determining unit 84 is configured to determine that data anomaly exists in response to determining that the offset exceeds a predetermined offset threshold.

In one embodiment, the distribution comparing module 834 is configured to determine a distribution state parameter of a randomly selected data packet in the current distribution, denoted as a first parameter; determine a distribution state parameter of the randomly selected data packet in the historical distribution, denoted as a second parameter; and determine a difference value between the first parameter and the second parameter. Correspondingly, the determining unit 84 is configured to determine that data anomaly exists in response to determining that the difference value exceeds a predetermined difference threshold.

In one embodiment, the historical distribution is a historical probability distribution obtained by processing the historical data with a hybrid Gaussian model. Correspondingly, the substitution module 831 is configured to substitute the plurality of data packets into the historical probability distribution, thereby obtaining a probability value of each of the plurality of data packets in the historical probability distribution, to obtain a plurality of probability values; the threshold comparing module 832 is configured to compare the plurality of probability values with a predetermined probability threshold, and determine a number of data packets having a probability value smaller than the probability threshold, denoted a first number. The determining unit 84 is configured to determine that data anomaly exists in response to determining that the first number exceeds a predetermined number threshold, or that a ratio between the first number and the number of the plurality of data packets exceeds a predetermined ratio threshold.

In one embodiment, when the historical distribution is a Gaussian probability distribution, the distribution determining module 833 is configured to process the plurality of data packets with a hybrid Gaussian model to obtain a current probability distribution; and the distribution comparing module 834 is configured to compare the current probability distribution with the historical probability distribution.

More specifically, in one example, the distribution comparing module 834 is configured to: determine a first peak position, where the first peak position is a peak position of a curve corresponding to the current probability distribution; obtain a second peak position, where the second peak position is a peak position of a curve corresponding to the historical probability distribution; and determine a position offset between the first peak position and the second peak position. Correspondingly, the determining unit 84 is configured to determine that data anomaly exists in response to determining that the position offset exceeds a predetermined offset threshold.

In another example, the distribution comparing module 834 is configured to determine an occurrence probability of a randomly selected data packet in the current probability distribution, denoted as a first probability; determine an occurrence probability of the randomly selected data packet in the historical probability distribution, denoted as a second probability; and determine a probability difference value between the first probability and the second probability. Correspondingly, the determining unit 84 is configured to determine that data anomaly exists in response to determining that the probability difference value exceeds a predetermined difference threshold.

In one embodiment, the historical distribution is a historical clustering distribution obtained with a clustering algorithm for the historical data. Accordingly, the substitution module 831 is configured to: determine a corresponding position of each of the plurality of data packets in the distribution space of the historical clustering distribution, to obtain a plurality of positions; and determine a distance between each of the plurality of positions and a corresponding cluster center position of the historical clustering distribution, to obtain a plurality of distances. The threshold comparing module 832 is configured to compare the plurality of distances with a preset distance threshold, to determine a number of distances exceeding the preset distance threshold, denoted as a second number. Correspondingly, the determining unit 84 is configured to determine that data anomaly exists in response to determining that the second number exceeds a predetermined number threshold, or that a ratio between the second number and the number of the plurality of data packets exceeds a predetermined ratio threshold.

In one embodiment, when the historical distribution is a historical clustering distribution, the distribution determining module 833 is configured to process the plurality of data packets with the clustering algorithm to obtain a current clustering distribution; and the distribution comparing module 834 is configured to compare the current clustering distribution with the historical clustering distribution.

More specifically, in one example, the distribution comparing module 834 is configured to: determine a first center position, where the first center position is a center position of a cluster corresponding to the current cluster distribution; obtain a second center position, where the second center position is a center position of a cluster corresponding to the historical clustering distribution; and determine a distance between the first center position and the second center position. Correspondingly, the determining unit 84 is configured to determine that data anomaly exists in response to determining that the distance exceeds a predetermined distance threshold.

In another example, the distribution comparing module 834 is configured to determine a distance between a position of a randomly selected data packet in the current clustering distribution and a center of the cluster corresponding to the current clustering distribution, denoted as a first distance; determine a distance between a position of the randomly selected data packet in the historical clustering distribution and the center of the cluster corresponding to the current clustering distribution, denoted as a first distance; and determine a distance difference value between the first distance and the second distance. Correspondingly, the determining unit 84 is configured to determine that data anomaly exists in response to determining that the distance difference value exceeds a predetermined difference threshold.

With the device described in the above embodiment, even if the currently obtained data packet is protected with privacy and loses business meaning, through statistical distribution of historical data, the current obtained data packet can be compared with the historical distribution to determine whether data anomaly exists, so that the data anomaly can be found more effectively, and then early warning and early intervention can be performed.

According to another embodiment of the present disclosure, there is also provided a computer-readable storage medium on which a computer program is stored, and when the computer program is executed in a computer, the computer is caused to perform the method described in conjunction with FIG. 2 to FIG. 6.

According to an embodiment of still another aspect, a computing device is further provided, including a memory and a processor, where the memory stores executable codes, and when the processor executes the executable codes, performs the method described in conjunction with FIG. 2 to FIG. 6.

Those skilled in the art should be aware that, in one or more of the above examples, the functions described in the present disclosure may be implemented by hardware, software, firmware, or any combination thereof. When implemented in software, these functions may be stored or transmitted as one or more instructions or codes on a computer-readable medium.

The specific embodiments described above further describe the objectives, technical solutions, and beneficial effects of the present disclosure in detail. It should be understood that the above are only specific embodiments of the present disclosure, and are not intended to be limiting. Any modification, equivalent replacement, or improvement made on the basis of the technical solution of the present disclosure should be included in the protection scope of the present disclosure.

What is claimed is:

1. A computer-implemented method for determination of anomalous data, the computer-implemented method comprising:

processing, by one or more processors, data packets comprising a data structure to determine a historical distribution of historical data based on the data structure and a current distribution corresponding to a data distribution state of the data packets;

determining, by the one or more processors, a first distribution state parameter of a randomly selected data packet in the current distribution;

determining, by the one or more processors, a second distribution state parameter of the randomly selected data packet in the historical distribution;

comparing, by the one or more processors, the current distribution of the data packets with the historical distribution by determining a difference value between the first distribution state parameter and the second distribution state parameter to generate a comparison result;

determining, by the one or more processors, that the difference value exceeds a predetermined difference threshold;

in response to determining that the difference value exceeds the predetermined difference threshold determining, by the one or more processors, that a data anomaly exists in the data packets; and in response to determining that the data anomaly exists in the data packets, generating, by the one or more processors, an alert indicating the data anomaly.

2. The computer-implemented method of claim 1, wherein comparing the data packets with the historical distribution comprises:
   generating a plurality of distribution state parameters by substituting the data packets into the historical distribution; and
   comparing the plurality of distribution state parameters with a predetermined threshold related to a distribution state to determine a number of data packets having a distribution state parameter exceeding the predetermined threshold.

3. The computer-implemented method of claim 1, wherein comparing the data packets with the historical distribution comprises:
   determining a data distribution state of the data packets as a current distribution; and
   comparing the current distribution with the historical distribution.

4. The computer-implemented method of claim 3, wherein comparing the current distribution with the historical distribution comprises:
   determining a distribution center of the current distribution;
   determining a distribution center of the historical distribution;
   determining an offset between the distribution center of the current distribution and the distribution center of the historical distribution;
   determining that the offset between the distribution center of the current distribution and the distribution center of the historical distribution exceeds a predetermined offset threshold; and
   in response to determining that the offset exceeds the predetermined offset threshold, determining that the data anomaly exists in the data packets.

5. The computer-implemented method of claim 3, wherein comparing the current distribution with the historical distribution comprises:
   determining a first distribution state parameter of a randomly selected data packet in the current distribution;
   determining a second distribution state parameter of the randomly selected data packet in the historical distribution;
   determining a difference value between the first distribution state parameter and the second distribution state parameter;
   determining that the difference value exceeds a predetermined difference threshold; and
   in response to determining that the difference value exceeds the predetermined difference threshold, determining that the data anomaly exists in the data packets.

6. The computer-implemented method of claim 1, wherein the historical distribution comprises a historical probability distribution determined by processing the historical data with a hybrid Gaussian model.

7. The computer-implemented method of claim 1, wherein the historical distribution comprises a historical clustering distribution determined by processing the historical data with a clustering algorithm.

8. A non-transitory, computer-readable medium storing one or more instructions executable by a computer system to perform one or more operations for determination of anomalous data, comprising:
   processing data packets comprising a data structure to determine a historical distribution of historical data based on the data structure and a current distribution corresponding to a data distribution state of the data packets;
   determining a first distribution state parameter of a randomly selected data packet in the current distribution;
   determining a second distribution state parameter of the randomly selected data packet in the historical distribution;
   comparing the current distribution of the data packets with the historical distribution by determining a difference value between the first distribution state parameter and the second distribution state parameter to generate a comparison result;
   determining that the difference value exceeds a predetermined difference threshold;
   in response to determining that the difference value exceeds the predetermined difference threshold determining that a data anomaly exists in the data packets; and
   in response to determining that the data anomaly exists in the data packets, generating an alert indicating the data anomaly.

9. The non-transitory, computer-readable medium of claim 8, wherein comparing the data packets with the historical distribution comprises:
   generating a plurality of distribution state parameters by substituting the data packets into the historical distribution; and
   comparing the plurality of distribution state parameters with a predetermined threshold related to a distribution state to determine a number of data packets having a distribution state parameter exceeding the predetermined threshold.

10. The non-transitory, computer-readable medium of claim 8, wherein comparing the data packets with the historical distribution comprises:
    determining a data distribution state of the data packets as a current distribution; and
    comparing the current distribution with the historical distribution.

11. The non-transitory, computer-readable medium of claim 10, wherein comparing the current distribution with the historical distribution comprises:
    determining a distribution center of the current distribution;
    determining a distribution center of the historical distribution;
    determining an offset between the distribution center of the current distribution and the distribution center of the historical distribution;
    determining that the offset between the distribution center of the current distribution and the distribution center of the historical distribution exceeds a predetermined offset threshold; and
    in response to determining that the offset exceeds the predetermined offset threshold, determining that the data anomaly exists in the data packets.

12. The non-transitory, computer-readable medium of claim 10, wherein comparing the current distribution with the historical distribution comprises:
    determining a first distribution state parameter of a randomly selected data packet in the current distribution;
    determining a second distribution state parameter of the randomly selected data packet in the historical distribution;

determining a difference value between the first distribution state parameter and the second distribution state parameter;

determining that the difference value exceeds a predetermined difference threshold; and in response to determining that the difference value exceeds the predetermined difference threshold, determining that the data anomaly exists in the data packets.

13. The non-transitory, computer-readable medium of claim 8, wherein the historical distribution comprises a historical probability distribution determined by processing the historical data with a hybrid Gaussian model.

14. The non-transitory, computer-readable medium of claim 8, wherein the historical distribution comprises a historical clustering distribution determined by processing the historical data with a clustering algorithm.

15. A computer-implemented system for determination of anomalous data, comprising:

one or more computers; and one or more computer memory devices interoperably coupled with the one or more computers and having tangible, non-transitory, machine-readable media storing one or more instructions that, when executed by the one or more computers, perform one or more operations, comprising:

processing data packets comprising a data structure to determine a historical distribution of historical data based on the data structure and a current distribution corresponding to a data distribution state of the data packets;

determining a first distribution state parameter of a randomly selected data packet in the current distribution;

determining a second distribution state parameter of the randomly selected data packet in the historical distribution;

comparing the current distribution of the data packets with the historical distribution by determining a difference value between the first distribution state parameter and the second distribution state parameter to generate a comparison result;

determining that the difference value exceeds a predetermined difference threshold;

in response to determining that the difference value exceeds the predetermined difference threshold determining that a data anomaly exists in the data packets; and in response to determining that the data anomaly exists in the data packets, generating an alert indicating the data anomaly.

16. The computer-implemented system of claim 15, wherein comparing the data packets with the historical distribution comprises:

generating a plurality of distribution state parameters by substituting the data packets into the historical distribution; and comparing the plurality of distribution state parameters with a predetermined threshold related to a distribution state to determine a number of data packets having a distribution state parameter exceeding the predetermined threshold.

17. The computer-implemented system of claim 15, wherein comparing the data packets with the historical distribution comprises:

determining a data distribution state of the data packets as a current distribution; and comparing the current distribution with the historical distribution.

18. The computer-implemented system of claim 17, wherein comparing the current distribution with the historical distribution comprises:

determining a distribution center of the current distribution;

determining a distribution center of the historical distribution;

determining an offset between the distribution center of the current distribution and the distribution center of the historical distribution;

determining that the offset between the distribution center of the current distribution and the distribution center of the historical distribution exceeds a predetermined offset threshold; and in response to determining that the offset exceeds the predetermined offset threshold, determining that the data anomaly exists in the data packets.

19. The computer-implemented system of claim 17, wherein comparing the current distribution with the historical distribution comprises:

determining a first distribution state parameter of a randomly selected data packet in the current distribution;

determining a second distribution state parameter of the randomly selected data packet in the historical distribution;

determining a difference value between the first distribution state parameter and the second distribution state parameter;

determining that the difference value exceeds a predetermined difference threshold; and in response to determining that the difference value exceeds the predetermined difference threshold, determining that the data anomaly exists in the data packets.

20. The computer-implemented system of claim 15, wherein the historical distribution comprises a historical probability distribution determined by processing the historical data with a hybrid Gaussian model or a clustering algorithm.

* * * * *